United States Patent [19]

Roach

[11] Patent Number: 4,493,468
[45] Date of Patent: Jan. 15, 1985

[54] ADJUSTABLE PIPE FASTENER

[76] Inventor: Thomas C. Roach, 5756 N. Fail Rd., LaPorte, Ind. 46350

[21] Appl. No.: 510,727

[22] Filed: Jul. 5, 1983

[51] Int. Cl.³ .............................................. F16L 3/10
[52] U.S. Cl. ................................... 248/62; 248/68.1; 248/74.1; 24/278; 211/60 A
[58] Field of Search ....................... 248/49, 58, 59, 62, 248/65, 67.5, 68 R, 70, 72, 74 R, 316 C; 403/188; 211/60 S, 60 A; 24/280, 281, 282, 284, 278

[56] References Cited

U.S. PATENT DOCUMENTS

| D. 257,947 | 1/1981 | Reynoso | 248/62 |
|---|---|---|---|
| 428,690 | 5/1890 | McKelvey | 248/59 |
| 849,132 | 4/1907 | Hook | 248/62 |
| 2,003,159 | 5/1935 | Taylor | 248/62 |
| 2,111,357 | 3/1938 | Cornell, Jr. | 248/62 |
| 3,185,418 | 5/1965 | Appleton | . |
| 3,353,775 | 11/1967 | Sebo | 248/70 |
| 3,787,015 | 1/1974 | Ablett | 248/230 |
| 3,866,871 | 2/1975 | Dupuy, Sr. | 248/59 |

FOREIGN PATENT DOCUMENTS

| 1092978 | 11/1960 | Fed. Rep. of Germany | 248/72 |
|---|---|---|---|
| 2404284 | 8/1975 | Fed. Rep. of Germany | 248/74 R |
| 218206 | 1/1968 | Sweden | 248/58 |
| 1350571 | 4/1974 | United Kingdom | 248/74 R |
| 499445 | 10/1976 | U.S.S.R. | 248/74 R |

OTHER PUBLICATIONS

Minerallac Electric Co., "Minerallac", Jan. 2, 1982.

*Primary Examiner*—William H. Schultz
*Assistant Examiner*—Robert A. Olson
*Attorney, Agent, or Firm*—Marmaduke A. Hobbs

[57] ABSTRACT

A pipe fastener for securing pipes along walls, ceilings or the like, having top and bottom members each having two generally broad, flat sides extending at approximately forty-five degree angles from a middle portion and a base portion, respectively. The four sides have a plurality of spaced, parallel slots with the slots in the top member being selectively engageable with the corresponding slots in the bottom member, thus forming an adjustable enclosure for receiving a pipe. A set screw is provided in the bottom member and disposed perpendicular to the pipe for securing the pipe within the fastener, thus providing both initial and final adjustability features. The pipe fasteners have been designed for use with common attachment devices, such as beam clamps or toggle bolts, and the fasteners can be connected in series for hanging or securing additional pipes along the same route.

12 Claims, 8 Drawing Figures

ADJUSTABLE PIPE FASTENER

BACKGROUND OF THE INVENTION

In the building trades and in residential applications, pipes are used extensively as conduits for electrical conductors or as a means of fluid transfer. Each conductor or fluid normally has its own pipe as required by building codes or due to practical considerations, such as separate pipes for hot and cold water. Also mandated by building codes or practical considerations is the requirement that pipes which travel any substantial distance be secured or attached in some manner to an adjacent wall, ceiling, or other supporting structure, with separate fasteners or securing means for each pipe normally being applied at regularly spaced intervals along the length of travel, subject to the particular wall, ceiling or supporting structure's configuration. Since pipes are made in various shapes and sizes, separate and distinct fasteners must be provided for each specific shape, size, or range of sizes. For example, with electrical conduit, three types of one-half inch pipe are normally available: one-half inch thinwall, one-half inch intermediate, and one-half inch rigid. The dimension, one-half inch, refers to the inside diameter of the pipe, with the thickness of the pipe wall being varied to produce the three types. These different types of pipe are produced in a wide range of sizes, including three-quarter inch, one inch, two inches, and up, thus normally requiring a different fastener for each range of sizes and possibly even for different types within the same size range, due not only to size considerations, but to weight considerations as well.

Accommodating the many sizes and shapes of pipe available, especially on large construction jobs where a substantial amount of pipe must be run, requires that a large stock of fasteners be kept to meet the varying demands. This requires considerable storage space, considerable advance planning to insure that sufficient fasteners or hangers are readily available, and may involve a substantial amount of time lost from the job, spent instead in hunting for the correct size or shape of fastener or in waiting for deliveries to replace depleted stock. Additional problems are encountered in securing the fasteners to the wall or ceiling itself. For example, where unistrut construction is employed, a series of washers is needed before conventional fasteners can be secured to the strut. In other applications, toggle bolts, beam clamps secured to I-beams, or all-thread bolts are used as attaching means with the pipe fastener connected thereto. These applications require additional types of pipe fasteners or other securing means and add to the overall problems of supply, the sufficiency of available stock, and the need to find and install the correct fastener.

SUMMARY OF THE INVENTION

It is, therefore, one of the principal objects of the present invention to provide a pipe fastener for hanging or securing pipes along ceiling or wall members and the like which can be used with and adjusted to fit a plurality of different sizes and shapes of pipe.

Another object of the present invention is to provide an adjustable pipe fastener which, by being adaptable to a wide range of pipe sizes, reduces or eliminates supply or stock problems or time lost in searching for the correct fastener, and which is simple to use and can be economically fabricated in a stamping operation.

A further object of the present invention is to provide an adjustable pipe fastener which adapts to a wide range of attaching means, such as beam clamps or toggle bolts, and a wide range of ceiling or wall configurations, and which can be connected in series where required by the particular installation.

The invention relates to an adjustable pipe fastener which can be used to hang or otherwise secure pipes along an adjacent ceiling, wall, or other supporting structure, and which can accommodate a plurality of different pipe sizes and shapes. The invention broadly has two halves which are interlocked or otherwise secured together, holding the pipe therebetween, and means for adjusting the pipe fastener, for securing the pipe within the fastener and for connecting the fasteners in series. In one embodiment, the fasteners have a top member and a bottom member, each having two generally broad, flat sides extending outwardly at approximately forty-five degree angles from a middle portion. The four sides have a plurality of spaced, parallel slots with the slots in the top member being selectively engageable with the corresponding slots in the bottom member, forming an adjustable enclosure for receiving the pipe. A set screw is normally provided in the bottom member and disposed perpendicular to the pipe for securing the pipe within the fastener, thus providing a final adjustment and retaining means. The present invention has also been designed for use with conventional attachment means where required, such as beam clamps, toggle bolts, or other devices having a similar function. The fasteners are normally constructed of metal or plastic and can be used with all types, sizes and shapes of pipe or conduit in residential, commercial, or industrial applications, thus reducing or eliminating the need to stock a different size and type of fastener for each different pipe size or shape. Scoring may be provided on the sides of the pipe fasteners so that the unused ends may be broken off in applications where limited space is available, as with an entire bank of pipes.

DETAILED DESCRIPTION OF THE PREFERRED EMBODIMENT

Figure 1:
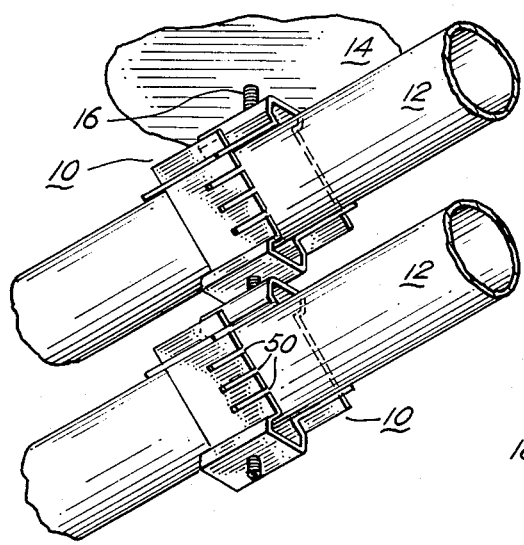
FIG. 1 is a perspective view of the adjustable pipe fastener embodying the present invention, shown here with two fasteners holding pipes while connected in series and suspended from a ceiling.
Figure 2:
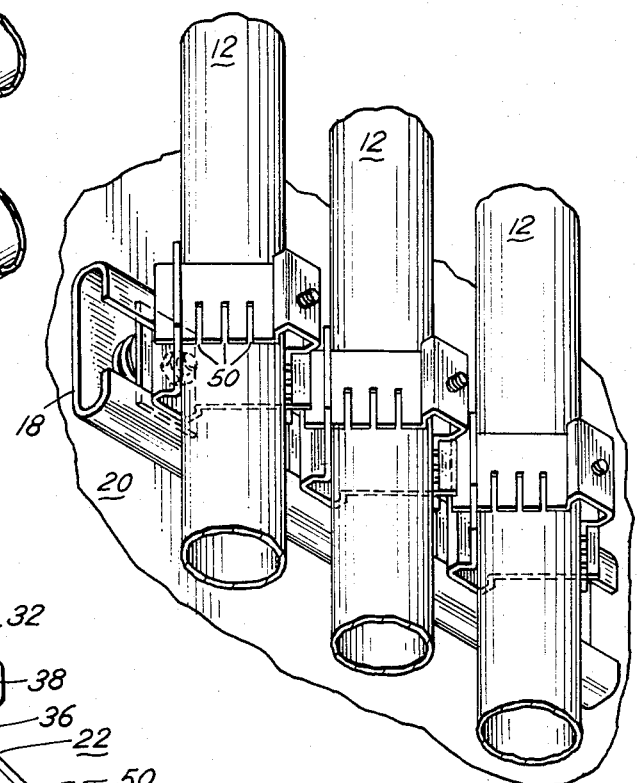
FIG. 2 is a perspective view of three pipe fasteners having pipes therein, the fasteners being secured to a beam clamp.

Referring more specifically to the drawings, and to FIG. 1 in particular, numeral 10 indicates generally the adjustable pipe fastener embodying the present invention. Two fasteners with pipes 12 running therethrough are shown suspended from a ceiling 14 by a toggle bolt 16, a common type of attaching means with which the present invention may be used. Another common attaching means is shown in FIG. 2, where the pipe fasteners have been mounted on a beam clamp 18, which has been secured to a wall or beam 20. As noted, the present invention has been designed for easy connection to commonly-used attaching means where necessary, such as the toggle bolt or beam clamp, as well as allthread bolts, or, where unistrut construction has been used for the building, for connection without requiring washers. The pipes shown in these drawings, like the attaching means, have been shown for illustration purposes, the present invention being adjustable for receiving and securing a plurality of pipes of different sizes and shapes.

Figure 3:
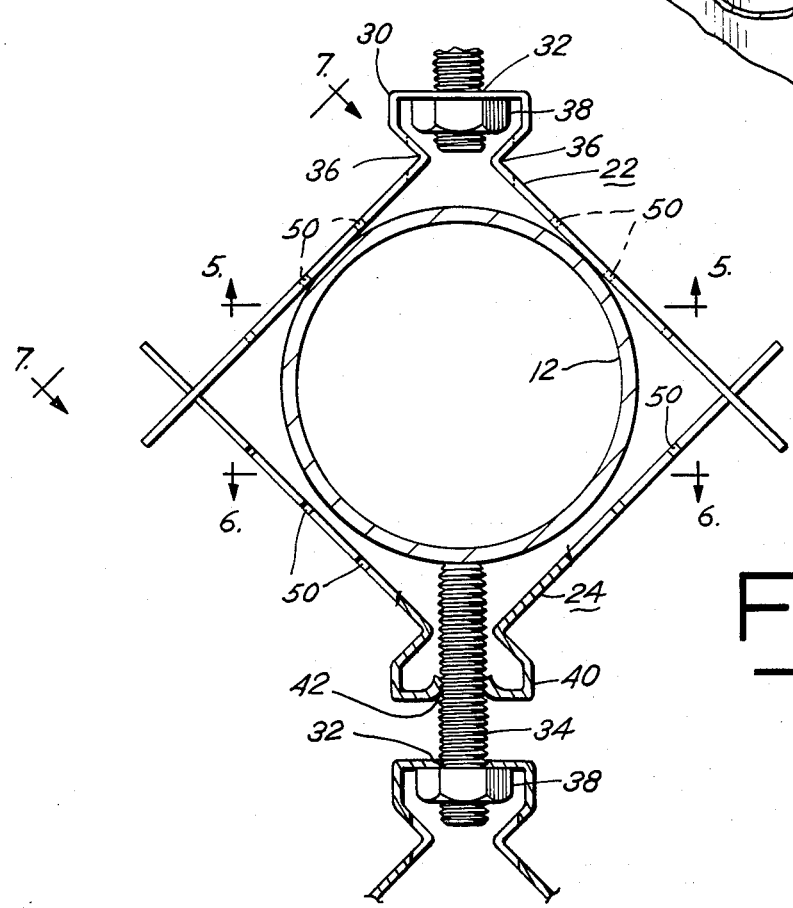
FIG. 3 is an end elevational and partial cross-sectional view of the pipe fastener shown in the preceding figures with a pipe secured therein.
Figure 4:
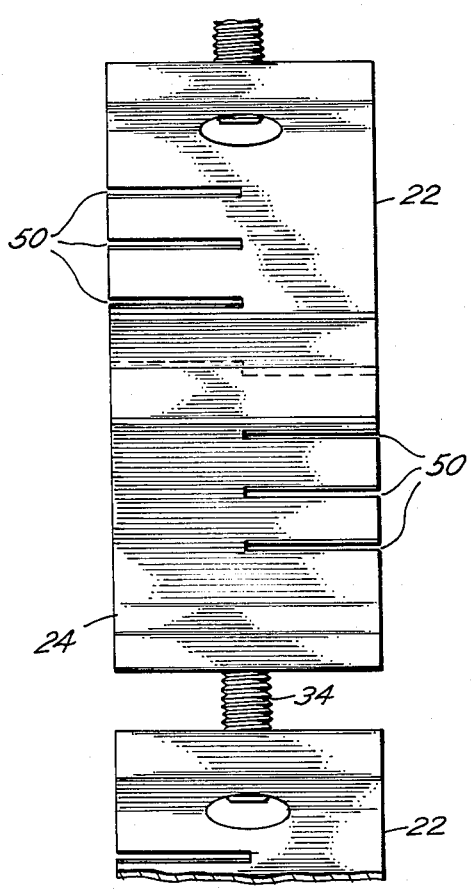
FIG. 4 is a side elevational view of the pipe fasteners shown in FIG. 1, shown here connected in series and without the pipes.
Figure 5:
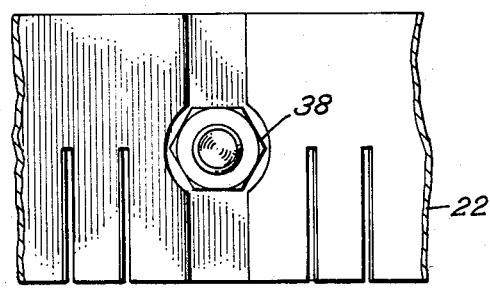
FIG. 5 is a fragmentary cross-sectional view of the pipe fastener, shown with the pipe removed, the section taken on line 5—5 of FIG. 3.
Figure 6:
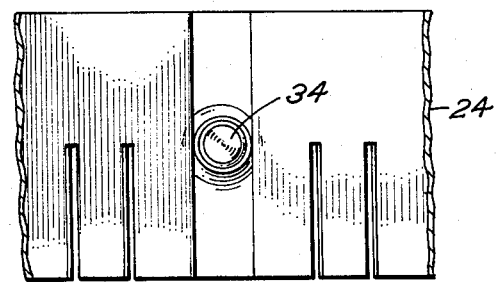
FIG. 6 is another fragmentary cross-sectional view of the pipe fastener, shown with the pipe removed, the section being taken on line 6—6 of FIG. 3.

The pipe fastener is preferably fabricated in two halves, normally in a stamping operation, and has a top member 22 and a bottom member 24, each member having two generally broad, flat sides disposed at approximately right angles to one another so that when the members are connected, a rectangular configuration is obtained for receiving the pipe. The top member has a middle portion 30 with a punched center hole 32 for connection to either a common attaching means such as the toggle bolt or to another pipe fastener, using set screw 34 where the fasteners are connected in series, as shown in FIGS. 1 and 3. A segment of middle portion 30 has been notched on both sides at 36, forming an opening through which a nut driver may be inserted to adjust nut 38 for securing the fastener to an attaching means or to another fastener, or for removing the fastener. Middle portion 30 of top member 22 and a base portion 40 of bottom member 24 have been designed with generally flat outer surfaces for seating flush with each other if connected in series, or to a wall or a common attaching means, as shown in FIG. 2. In practice, however, flush seating may or may not be desirable; thus, the pipe fastener has been designed to perform its function equally well while suspended by nut 38, as shown in FIGS. 1 and 3. The base portion 40 of bottom member 24 has a center hole 42, pierced to facilitate threading, for receiving set screw 34 which can be tightened against the pipe to secure the pipe within the fastener or loosened to remove the pipe after its installation. As shown in FIG. 3, the set screw serves to secure the pipe and to receive another fastener through hole 32, held thereon by nut 38.

A plurality of parallel, regularly spaced slots 50 are cut in the opposing sides of top member 22 and bottom member 24, each of the slots extending inwardly from one edge to the approximate midpoint in each of the four sides and at right angles to the respective edge. The slots are disposed so that each slot has a corresponding slot in the opposing member with which it interlocks, creating the rectangular enclosure which, with the aid of the set screw 34, secures the pipe. The embodiment disclosed here has four slots in each side of the fastener and when in use, as shown in FIG. 3, the outermost slots in the top and bottom members are interlocked for the size of pipe shown. Where a different sized pipe is used, such as one-half inch rigid, one-half inch intermediate, or one-half inch thinwall conduit, for example, the innermost slots on both of the members would be interlocked. Similarly, the succeeding slot in each of the sides, when interlocked, will secure ¾" rigid, ¾" intermediate, ¾" thinwall, 1" rigid, 1" intermediate, and 1" thinwall, the adjustment of the set screw serving to make up for the difference in the thicknesses of the pipe walls. The slots themselves have been designed approximately 0.010 to 0.015 inches wider than the material used for the fastener, providing a snug fit. Scoring lines 52 or kerfs are provided on the sides of the pipe fastener extending from the inner end of the slots to the edge of the fastener opposite the outer end of the slots, and parallel with the respective slots, so that the unused portions of the sides of the fastener may be broken off where necessitated by installations in which limited space is available.

Figure 8:
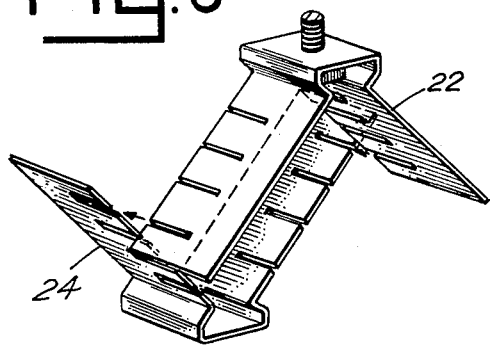
FIG. 8 is an exploded, perspective view of the pipe fastener shown in the preceding figures, illustrating the two-part construction, the arrows indicating the manner in which the two parts are assembled.
Figure 7:
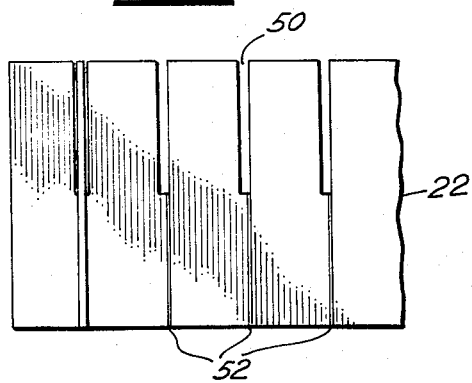
FIG. 7 is a fragmentary side elevational view of the outer surface of one side of the pipe fastener shown in the preceding figures, the view taken on line 7—7 of FIG. 3, illustrating the slots and the scoring lines.

The close tolerance provided between the width of the slots and the width of the material used for the fasteners provides a slight resistance when connecting the top and bottom members and also when disconnecting the members, thus keeping the members interlocked when threading pipe through installed fasteners or when adjusting or adding additional fasteners. Where pipe couplings larger in diameter than the pipe being run are disposed at the location desired for installing a fastener, the configuration of the fastener may be changed to accommodate this extra diameter by using the succeeding slots. The pipe fastener thus provides both an initial adjustment means, using the slots, and a final adjustment means, using the set screw. The two-part construction of the pipe fastener is clearly illustrated in FIG. 8 where top member 22 and bottom member 24 are shown ready for interlocking, the arrows indicating the opposing, communicative slots which interlock to form the enclosure wherein the pipe is received and secured.

The use and operation of the pipe fastener embodying the present invention may be practiced in either of two ways, dependent upon the weight and the length of the particular pipes. Where relatively lightweight pipe sections are being run, the top member 22 is secured to the wall or ceiling and the bottom member 24 is then interlocked with the top member, using the slots 50 which correspond to the particular pipe size. The pipe is then threaded through the assembled fasteners and the set screw 34 is tightened against the pipe, holding it securely within the fastener. Where relatively heavy pipe sections are being run, the top member is secured along the wall or ceiling, and the pipe is then held in place while the bottom member is interlocked with the top member, using the corresponding slots for the particular pipe size. The set screw is then tightened against the pipe, securing it within the fastener. Where necessary, conventional pliers or a similar tool may be used to break off the unused side portions of the fastener along the scored lines 52, and the fasteners may be connected in series where more than one pipe must be secured along the same route. The embodiment disclosed herein has been designed to accept and secure pipes ranging from one-half inch inside diameter to two inches inside diameter, whether thinwall, intermediate, or rigid. Larger or smaller fastener embodiments are included within the scope of the disclosure and the broad concept of the present invention, for fastening larger or smaller pipes. The members used to form the enclosure for receiving a pipe have been designated as top and bottom members for ease of description and explanation, but this designation is in no way intended to limit the scope of the present invention. It is understood that in certain applications, the members may be, for example, horizontally arranged where the pipes are disposed parallel with a wall or other upright surface, thus changing their top and bottom orientations. Nevertheless, these variations are included within the present concept.

While one embodiment of a pipe fastener has been shown and described in detail herein, various changes and modifications may be made without departing from the scope of the present invention.

I claim:

1. A pipe fastener for hanging or otherwise supporting pipe installations, comprising a top member having sides extending outwardly and disposed at substantially right angles to one another, a bottom member having sides extending outwardly and disposed at substantially right angles to one another, said top and bottom members being interconnected and forming an enclosure for receiving a pipe, an adjustment means for changing the size of said enclosure including a plurality of spaced parallel slots disposed in said first and second mentioned sides and extending inwardly at substantially right angles from one edge of said sides, and a means for securing said pipe within said enclosure.

2. A pipe fastener as defined in claim 1 in which each of said slots in said top member is selectively engageable with a corresponding slot in said bottom member.

3. A pipe fastener as defined in claim 2 in which said means for securing said pipe within said fastener includes a set screw threadedly connected to said bottom member and disposed substantially perpendicular to said pipe for adjustment against said pipe.

4. A pipe fastener as defined in claim 1 in which said top member has a middle portion between said first mentioned sides with a generally flat outwardly facing surface and a center hole therein.

5. A pipe fastener as defined in claim 4 in which said bottom member has a base portion between said second mentioned sides with a generally flat outwardly facing surface and a threaded center hole therein.

6. A pipe fastener as defined in claim 5 in which a set screw is disposed in said threaded hole and is disposed substantially perpendicular to the pipe for securing said pipe within said fastener.

7. A pipe fastener as defined in claim 6 in which said spaced parallel slots extend inwardly at substantially right angles from one edge of said sides to the approximate midpoint thereof.

8. A pipe fastener for supporting pipes, conduits and the like, comprising a top member having two first sides, said first sides extending outwardly at substantially right angles to one another, a bottom member having two second sides, said second sides extending outwardly at substantially right angles to one another, said top and bottom members being interconnected and forming an enclosure for receiving a pipe, each of said first and second mentioned sides being plate-like and having a plurality of spaced parallel slots extending inwardly from facing edges of said first and second mentioned sides to the approximate midpoint thereof, and a means for securing the pipe against the inner surface of said sides of said fastener.

9. A pipe fastener as defined in claim 8 in which each of said slots in said top member is selectively engageable with a corresponding slot in said bottom member for adjusting the size of said enclosure.

10. A pipe fastener as defined in claim 9 in which said means for securing said pipe includes a base portion between said second sides, and a set screw disposed in said base portion and disposed substantially perpendicular to the pipe for securing the pipe within said fastener.

11. A pipe fastener as defined in claim 8 in which a base portion is disposed between said second sides and has a threaded center hole with a set screw disposed in said hole, said screw being disposed substantially perpendicular to the pipe for securing the pipe against the inner surfaces of said sides of said fastener.

12. A pipe fastener as defined in claim 11 in which a middle portion is disposed between said first sides, having a center hole selectively engageable with said set screw for connecting two of said pipe fasteners in sequential alignment.

* * * * *